United States Patent [19]
Mitchell

[11] 3,895,667
[45] July 22, 1975

[54] PNEUMATIC TIRE AND WHEEL RIM ASSEMBLY

[75] Inventor: William E. Mitchell, Coventry, England

[73] Assignee: Dunlop Holdings Limited, England

[22] Filed: Oct. 6, 1972

[21] Appl. No.: 295,542

Related U.S. Application Data

[62] Division of Ser. No. 125,513, March 18, 1971, Pat. No. 3,708,847.

[52] U.S. Cl............ 152/378 R; 152/381.1; 152/405; 152/428; 301/11 R
[51] Int. Cl... B60b 21/02; B60b 21/06; B60b 23/08
[58] Field of Search............ 152/376,378, 379, 380, 152/381, 382, 383, 384, 401, 378 R, 381 A, 405, 428; 29/159.01; 301/11 R; 72/62, 71, 355

[56] References Cited
UNITED STATES PATENTS

| | | | |
|---|---|---|---|
| 1,589,449 | 6/1926 | Williams | 152/401 X |
| 1,645,921 | 10/1927 | Moore | 152/384 X |
| 1,741,716 | 12/1929 | Hunt | 301/63 R |
| 2,162,735 | 6/1939 | Lyon | 29/159.01 |
| 2,405,954 | 8/1946 | Hollerith | 152/401 X |
| 2,742,873 | 4/1956 | Moore | 72/62 |
| 3,298,218 | 1/1967 | Gollwitzer | 72/355 |
| 3,406,548 | 10/1968 | Wilcox | 72/71 |
| 3,588,981 | 6/1971 | Beharrell et al. | 152/330 R X |
| 3,708,847 | 1/1973 | Mitchell | 152/379 X |

FOREIGN PATENTS OR APPLICATIONS

| | | |
|---|---|---|
| 1,016,922 | 1/1966 | United Kingdom |
| 1,161,228 | 1/1964 | Germany |

Primary Examiner—Robert S. Ward, Jr.
Assistant Examiner—Howard Beltran
Attorney, Agent, or Firm—Stevens, Davis, Miller & Mosher

[57] ABSTRACT

A pneumatic tire and wheel rim assembly in which the rim has side flanges, bead seats adjacent the flanges and a base portion therebetween. The base portion has a radially inwardly directed depressed well or bead which is formed by axially compressing a well in the base portion, thus reducing its width. The well is first used to enable the tire to be mounted on the rim and then compressed so as to prevent the tire from becoming dismounted, even when running deflated. The radially inwardly directed bead may be conveniently clamped to the wheel body.

13 Claims, 15 Drawing Figures

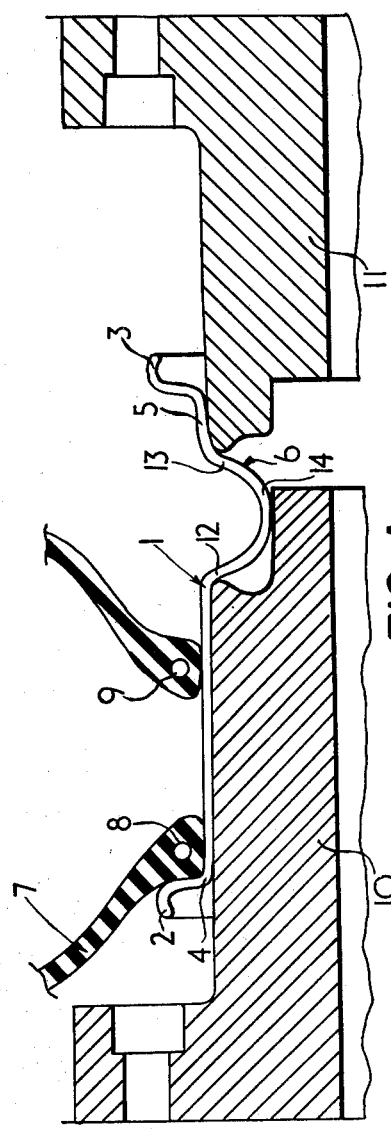
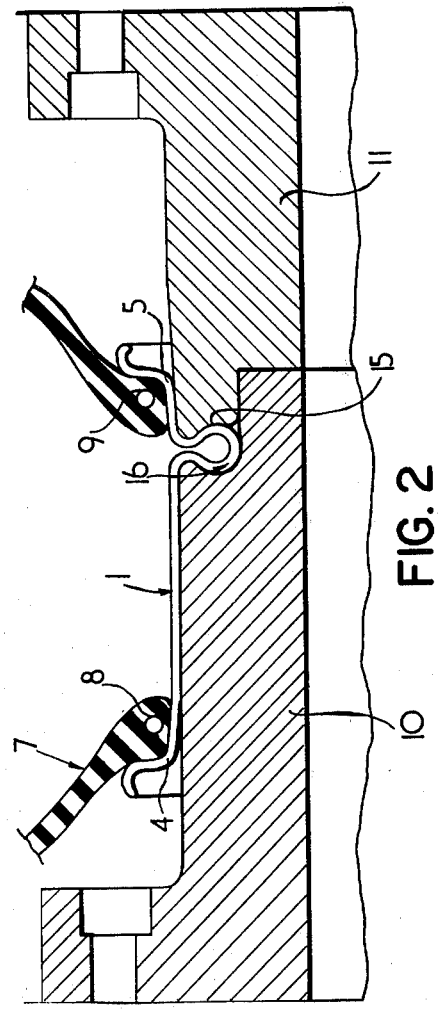

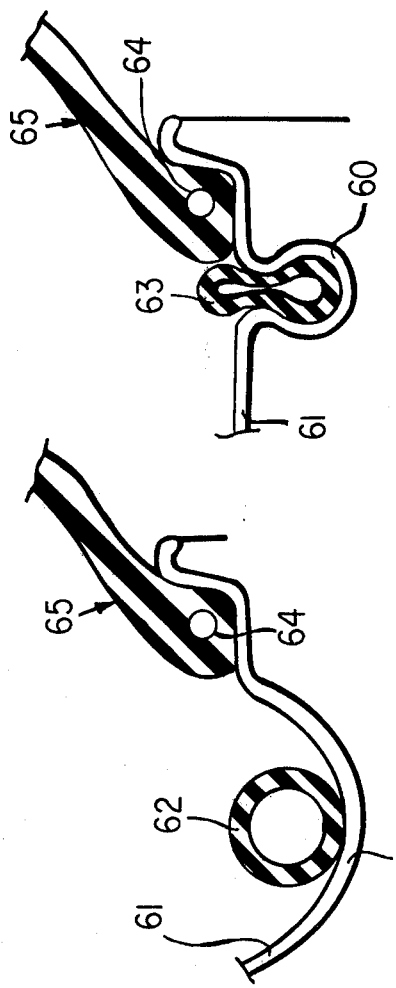
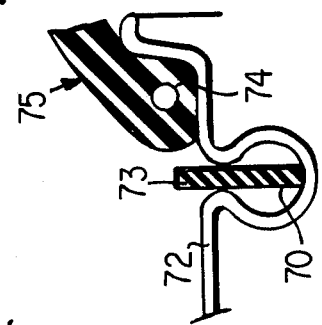
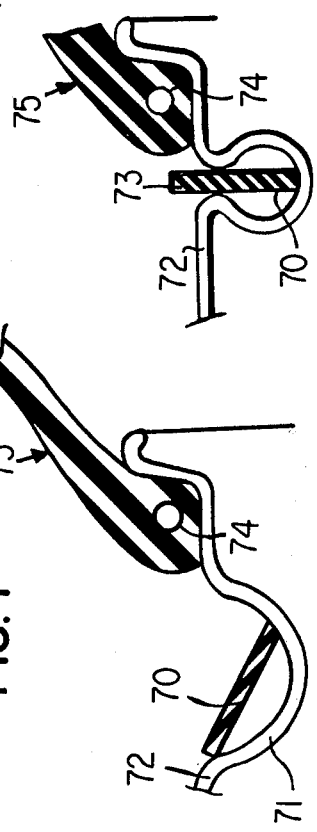

PNEUMATIC TIRE AND WHEEL RIM ASSEMBLY

This application is a division of copending application Ser. No. 125,513 filed Mar. 18, 1971, now U.S. Pat. No. 3,708,847 issued Jan. 9, 1973.

This invention relates to vehicle wheels.

One object of the present invention is to provide a method for the manufacture of an assembly comprising a pneumatic tire and a wheel rim having in cross-section a substantially flat, or well-less, base portion, and other objects of the invention are to provide a wheel rim and a wheel and pneumatic tire assembly.

According to one aspect of the invention, a method of mounting a pneumatic tire on a wheel rim having side flanges and a circumferentially extending radially inwardly depressed well portion comprises fitting the tire to the rim by a method employing the said well portion to enable the tire beads to pass over a rim flange, and subjecting at least the well portion of the rim to axial compression so as to reduce the axial width of the well portion.

According to another aspect of the invention, a method of mounting a pneumatic tire on a sheet metal wheel rim having side flanges and a circumferentially extending radially inwardly depressed well portion comprises fitting the tire to the rim by a method employing the said well portion to enable the tire beads to pass over a rim flange, placing the rim and tire assembly in a press having a pair of dies which engage the outer sides of the well and moving the dies axially relative to one another to compress the rim axially and to deform the said well portion into a circumferential bead portion formed between the dies in the closed position thereof, the rim having in its final state after the pressing operation a radially inwardly projecting circumferentially extending bead portion corresponding to the original well portion.

According to a further aspect of the invention a method for the manufacture of a wheel rim from a deformable material comprises locating an open-ended tubular section of said material within an annular die member, locating a deformable pressing element within the tubular section of deformable material, and compressing the pressing element so as to extend radially outwardly said tubular section of deformable material.

According to another aspect of the invention an apparatus for axially compressing a wheel rim comprises a pair of die portions which may each extend within beadseating portions of the wheel rim, each die being provided with a face engageable with a radially inwardly projecting well formed in a base portion of the wheel rim.

A rim and tire assembly produced by the method described above may be secured by means of the circumferential bead portion to a wheel centre incorporating clamping means for engagement with the said bead portion, thus providing a wheel having a demountable rim.

According to the present invention a wheel and pnuematic tire assembly comprises a wheel body portion and a wheel rim having circumferentially extending side flanges and a base portion therebetween, the base portion having a circumferentially extending bead portion formed integrally therein and extending radially inwardly therefrom, the wheel body portion being provided with clamp means for engagement in gripping contact with the circumferentially extending bead portion of the wheel rim.

In one embodiment, the bead portion may be arranged adjacent one side of the rim, thus providing a flat based or well-less rim having substantially greater radial clearance within the rim than is provided by conventional well-base rims. This is particularly advantageous in that it enables a relatively large brake to be housed within the wheel.

In an alternative embodiment, the well base may be formed into a centrally disposed bead portion, and in this embodiment the arrangement may be such that the associated tire beads are brought closely together and adjacent the center line of the wheel. In an embodiment of this kind, the rim flanges may incorporate extended portions which serve to support the lower sidewall regions on the tire, particularly in the event of a loss of inflation pressure.

Various known wheel rim profiles may be employed, for example in embodiments incorporating a flat base rim it may be desirable to provide an elevated protrusion or "hump" adjacent at least one of the tire beads to prevent axial displacement thereof.

Seven embodiments of the invention will now be described by way of example with reference to the accompanying drawings in which:

FIG. 1 is a cross-sectional view of a rim and tire assembly before the formation of a bead portion projecting inwardly from the rim;

FIG. 2 is a similar cross-sectional view to that of FIG. 1, but showing the rim formed with an inwardly projecting bead portion;

FIG. 7 is a cross-sectional view of a part of another rim and tire assembly before the formation of a bead portion on the rim;

FIG. 8 is a similar cross-sectional view to that of FIG. 7, but showing the rim formed with a bead portion;

FIG. 9 is a cross-sectional view of a further rim and tire assembly before the formation of a bead portion on the rim;

FIG. 10 is a similar cross-sectional view to that of FIG. 9 but showing the rim formed with a bead portion;

Figure 3:
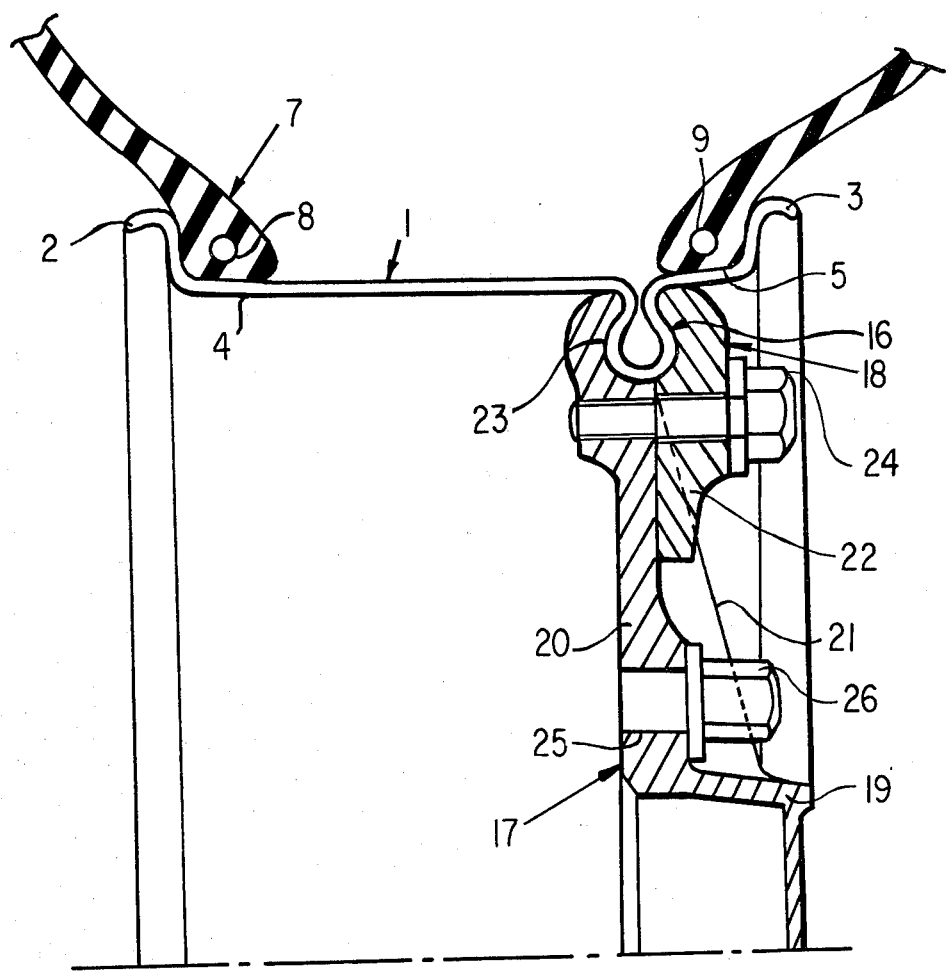
FIG. 3 is a sectional view on the line III—III of FIG. 4.
Figure 4:
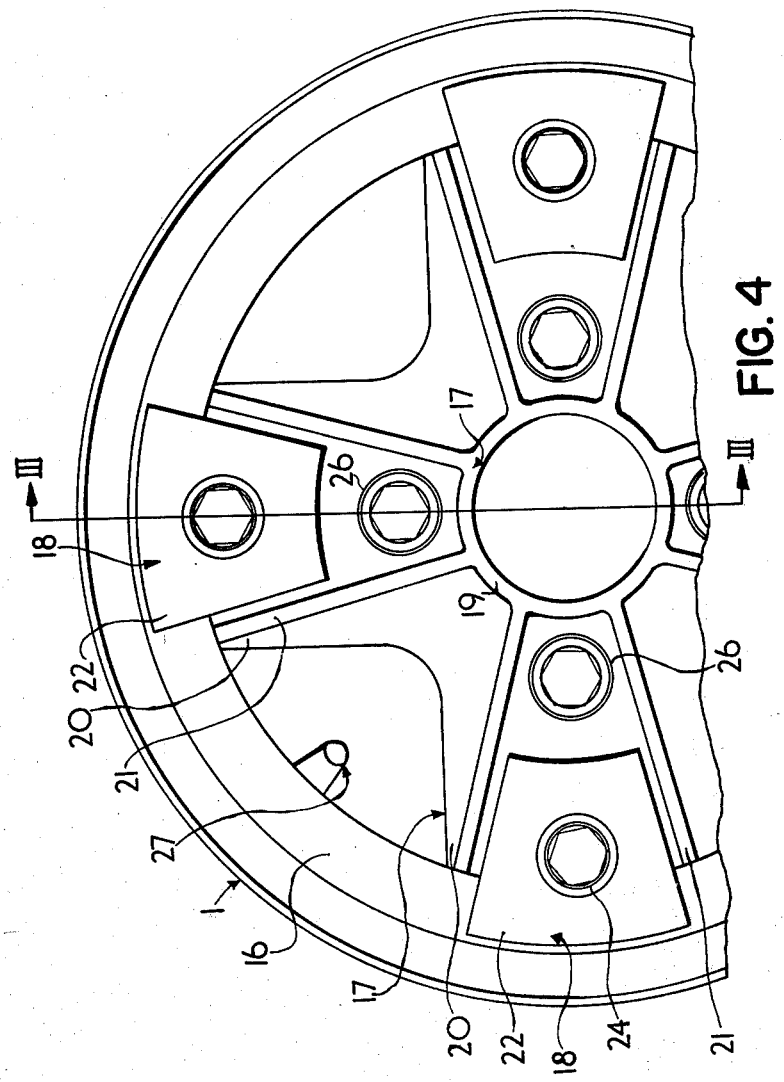
FIG. 4 is a side elevation of part of a rim and tire assembly secured by clamp means to a wheel centre.

In a first embodiment of the invention, illustrated in FIGS. 1 to 4, a rim and pneumatic tire assembly in which the tire is secured permanently to the rim is produced by the following method.

a well-base sheet metal rim 1 is formed with a cross-sectional profile of generally conventional form incorporating a pair of side flanges 2, 3 and a pair of bead-seating portions 4, 5 tapered at an angle of 5° to the axis of the rim, the profile departing from the conventional form only in respect of the well portion 6 which is of a substantially symmetrical cross-sectional shape. The rim 1 is produced with a greater axial width than that which is required for the completed rim and tire assembly.

A pneumatic tire 7 of conventional form is fitted to the rim 1 described above in the conventional manner, employing the well 6 to enable the tire beads 8, 9 to be passed over the adjacent rim flange 3. After fitting the tire, the assembly is placed in a press between two dies 10, 11 which fit within the bead-seating portions 4, 5 of the rim and engage the sides 12, 13 of the well base portion 6. The dies 10, 11 are formed so that when closed together they compress the radially outer portions of the sides of the well into contact with one another, the radially inwardly projecting portion 14 of the well being accommodated in a channel 15 of substantially circular cross-section formed between the two closed dies 10, 11.

The dies 10, 11 are thus moved together as described above to compress the well portion 6 of the rim 1 axially and simultaneously to move the bead-seating portions 4, 5 towards one another, and after the pressing operation the rim will be of narrower width and of generally flat based profile, the original well portion 6 having been formed into a hollow circumferentially extending bead portion 16 (see FIG. 2) of generally symmetrical cross-section located adjacent one bead-seating portion 5 and projecting radially inwardly from the rim.

The inwardly projecting bead portion 16 forms a convenient means by which the rim and tire assembly may be demountably secured to a wheel center 17 (see FIGS. 3 and 4) incorporating clamp means 18 for engagement with the bead portion 16.

The wheel center 17 may comprise a central boss 19 and four radial spokes 20 formed for example as a light alloy casting having suitable strengthening ribs 21, and the clamping means 18 may comprise four clamp plates 22 secured one to the end of each spoke 20 and shaped at their radially outer ends to engage the axially outer, or outboard side of the bead poriton 16. In this arrangement, the spokes 20 are provided with suitably shaped recesses 23 at their outer ends to fit against the axially inner, or inboard side of the bead portion 16 and a clamp bolt 24 is provided, passing through the clamp plate 22 and screw-threadedly engaging a tapped hole in the associated spoke to enable the bead portion to be gripped between the clamp plate and the spoke, which co-operate together in the manner of a pair of vice jaws. Holes 25 for normal wheel fixing studs 26 are provided in the spokes.

The rim and tire assembly described above is intended for tubeless operation and a conventional inflation valve 27 is fitted in the central region of the rim 1, the valve having an L-shaped stem which projects, for access, through a gap betwween two of the spokes.

The rim and tire assembly method described above has a number of important practical advantages. It enables a rim and tire assembly to be manufactured and sold as a unit at relatively low cost, avoiding the necessity when changing tire of carrying out the time-consuming operation of demounting and mounting a tire on a rim. It also makes it possible for a motorist to interchange relatively quickly sets of tires suitable respectively for winter and summer motoring. An advantage in terms of vehicle design is that the rim is flat-based, and the absence of the normal well portion thus enables a relatively larger brake to be accommodated within the confines of the wheel rim.

A further advantage of the method described above is that by the use of accurately machined dies which engage the radially inner surfaces of the bead-seating portions 4, 5 of the wheel rim as well as the sides 12, 13 of the well portion it is possible to "true" the rim simultaneously with the axial compression of the rim, thus reducing any eccentricity which may have arisen during the previous rim-forming operations.

In its final form the rim 1 produced as described above is of substantially flat profile between the bead-seating regions 4, 5 and is thus more effective than the well-base type of rim in resisting axial displacement of the tire beads 8, 9 under cornering forces. In particular, the provision of a flat-base profile reduces the rate of loss of air between the rim and tire which may occur with a well-base rim due to displacement of the tire beads in the event of a puncture, and substantially assists the tire to remain true when in a "run-flat" condition.

In a second embodiment of the invention a rim and tire assembly is produced by the method described above except that means is provided to hold the tire beads more securely against axial forces. Particularly in certain circumstances such as the "run-flat" condition where a tire is required to be capable of running without inflation pressure, it is desirable to hold the tire beads securely against axial forces and one means for securing the tire is to provide a circumferentially extending radial protrusion or "hump" in the rim profile adjacent at least one of the beads.

A hump may be formed simultaneously with the axial compression of the rim by incorporating in one of the dies a deformable pressing element in the form of a pressing ring of a compressible material such as rubber, the pressing ring being arranged to be compressed axially by the movement together of the dies and thus squeezed radially outwardly to form the hump in the wheel rim. A single pressing ring may be used, but in a preferred method, illustrated in FIG. 5, an inboard die 30 has a reduced-diameter cylindrical portion 31 extending from an inboard bead-seating portion 32 of the rim 33 to a point beyond a bead portion 34. Two collars 35, 36 are slidably mounted on the cylindrical portion 31 and rubber or polyurethane pressing rings 37, 38 are mounted one between the two collars 35, 36 and one between the inboard collar 35 and a shoulder 39 formed at the inboard end of the die 30. The collars 35, 36 have, on their inboard sides, reduced-diameter spacing portions 40, 41 which extend slidably into annular recesses formed, respectively, in the shoulder portion 39 of the inboard die and in the inboard collar 35.

The arrangement is such that when the inboard die 30 and the outboard die 42 are pressed axially towards one another the well portion 34 of the rim 33 is first formed into a radially inwardly projecting bead portion as described above in respect of the first embodiment and subsequently the metal of the rim is expanded by the pressing rings 37, 38 to form humps 43, 44 adjacent, respectively, the inboard and outboard tire beads 45, 46 of a tire 47. The size of the humps 43, 44 is limited by the engagement of the spacing portions 40, 41 of the collars 35, 36 with the bases of their associated recesses.

Figure 6:
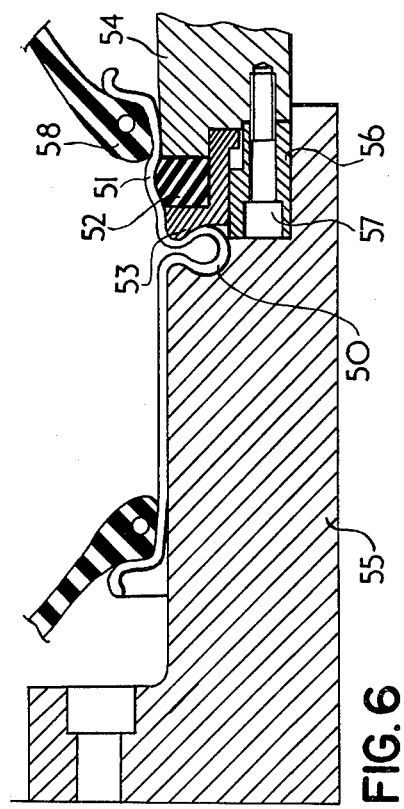
FIG. 6 is a similar view to that of FIG. 5, showing another form of a rim and tire assembly.

In a third embodiment, illustrated in FIG. 6, a wheel rim is formed as described in respect of the preceding embodiment except that instead of providing a hump on the inboard side of the inwardly projecting bead portion 50 a hump 51 is formed on the outboard side by introducing a rubber pressing ring 52 between relatively axially movable die parts 53, 54 on the outboard side of the bead portion, the compression of the ring and size of the hump being limited by the engagement of the inboard die 55 with a spacing collar 56 secured by bolts 57 to the outboard die 54. The hump 51 provides a positive clamp for the outboard tire bead 58, but has the disadvantage that the bead may need to be positioned nearer to the central region of the rim with a consequent reduction in the space available within the rim.

Figure 5:
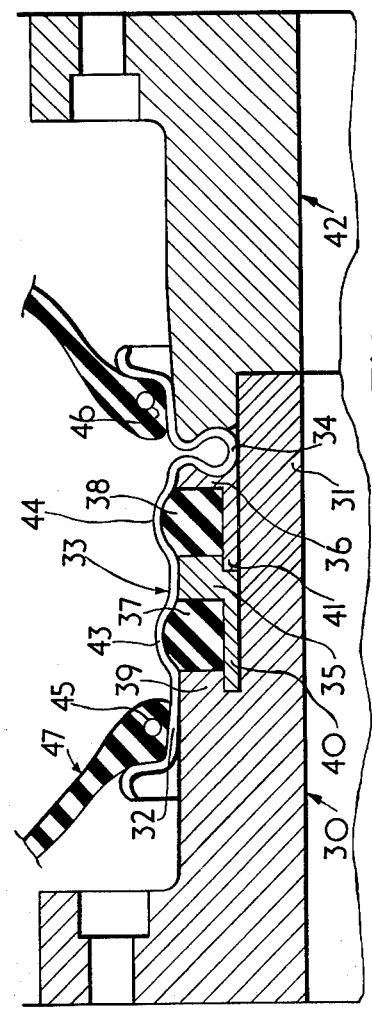
FIG. 5 is a cross-sectional view of a rim and tire assembly and means for forming tire bead retaining humps around the rim.

In a fourth embodiment, illustrated in FIGS. 7 and 8, and 9 and 10, a rim and tire assembly is produced by the method described in respect of the first embodiment, except that a deformable locking member is secured within an inwardly extending bead portion so as to hold the outboard bead of a tire against axial displacement, without further local distortion of the rim as described with reference to FIGS. 5 and 6.

One example of such means is illustrated in FIGS. 7 and 8 and involves providing in the well 60 of a rim 61, a hollow tube 62 (alternatively solid) of rubber, plastic, or thermoplastic material which is placed in position before axial compression takes place and which is forced radially outwardly when the well portion is compressed so that it projects to form a circumferentially extending ridge 63 adjacent the outboard bead 64 of a tire 65. An alternative method, illustrated in FIGS. 9 and 10 is to place a split metal ring 70 formed from flat strip in a well portion 71 before axial compression takes place, the ring being forced into radial alignment as the two sides of the well are brought together, and projecting above the surface of the rim base 72 so that it projects to form a circumferentially extending ridge 73 adjacent the outboard bead 74 of a tire 75. The metal ring may be initially conical in form to enable the outboard tire bead to pass over it easily during assembly. In assembly of the tire on the rim, the rim well is utilized to enable the tire beads to pass over the outboard rim flange and subsequent to fitting the locking member into the well, the outboard tire bead is passed over the well and locking member and on to the outboard bead-seating region.

Figure 11:
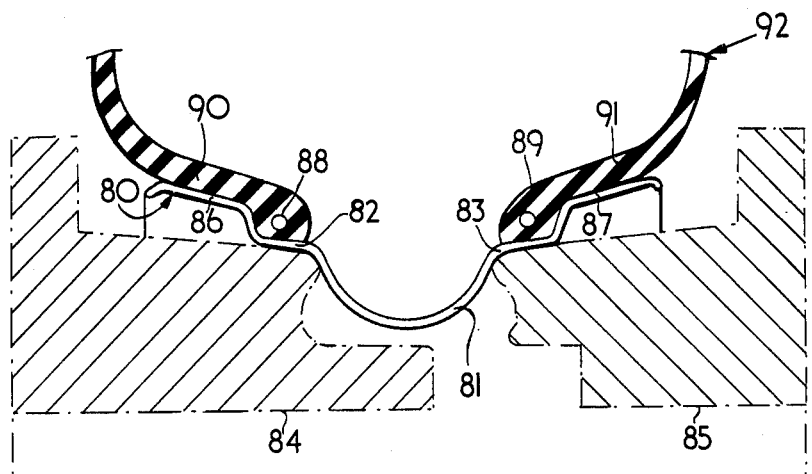
FIGS. 11 and 12 are similar views to those of FIG. 1 and FIG. 2 respectively, but showing the formation of another rim and tire assembly.
Figure 12:
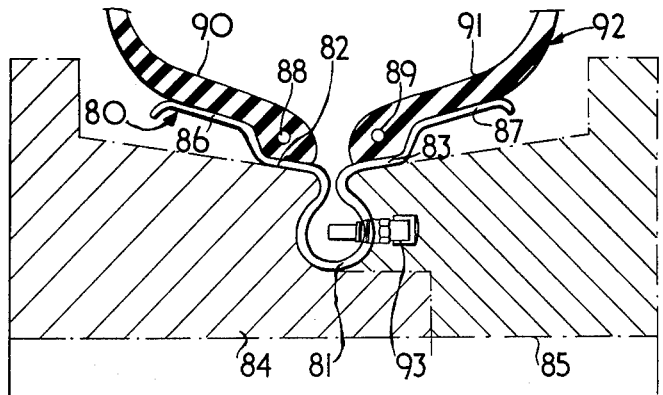

In the embodiments described above the radially inwardly projecting bead is located adjacent the outboard tire bead and spaced from the inboard tire bead, but in a fifth embodiment illustrated in FIG. 11 and FIG. 12 a rim 80 is formed, by the method in accordance with the invention, with a central bead portion 81. In this embodiment the bead-seating regions 82, 83 of the rim are brought close together by the action of a pair of dies 84, 85 and the outer edges 86, 87 of the rim flanges are extended and flared axially outwardly at an angle of the order of 15° to the axis to provide support for the beads 88, 89 and lower sidewall regions 90, 91 of a tire 92. An inflation valve 93 is subsequently fitted in the wall of the inwardly extending bead portion. This arrangement has particular advantages in the run-flat condition, that is, when the tire is deflated as a result of a puncture, since the tire beads are positively located and the extended side flanges help to spread the load on the tire.

While in the embodiments described above the inwardly projecting bead portion is of circular cross-section throughout its circumferential length, this cross-section may be of rectangular, triangular or other form and may, for example, be provided with indentations or protrusions to constitute drive transmitting formations engageable with corresponding formations on an associated wheel body portion or clamping means. The clamping means may take various alternative forms, for example the four clamping plates described above in respect of the first embodiment may be replaced by a continuous clamping ring and in certain embodiments the rim may be welded or otherwise permanently secured to a wheel body portion.

Figure 13:
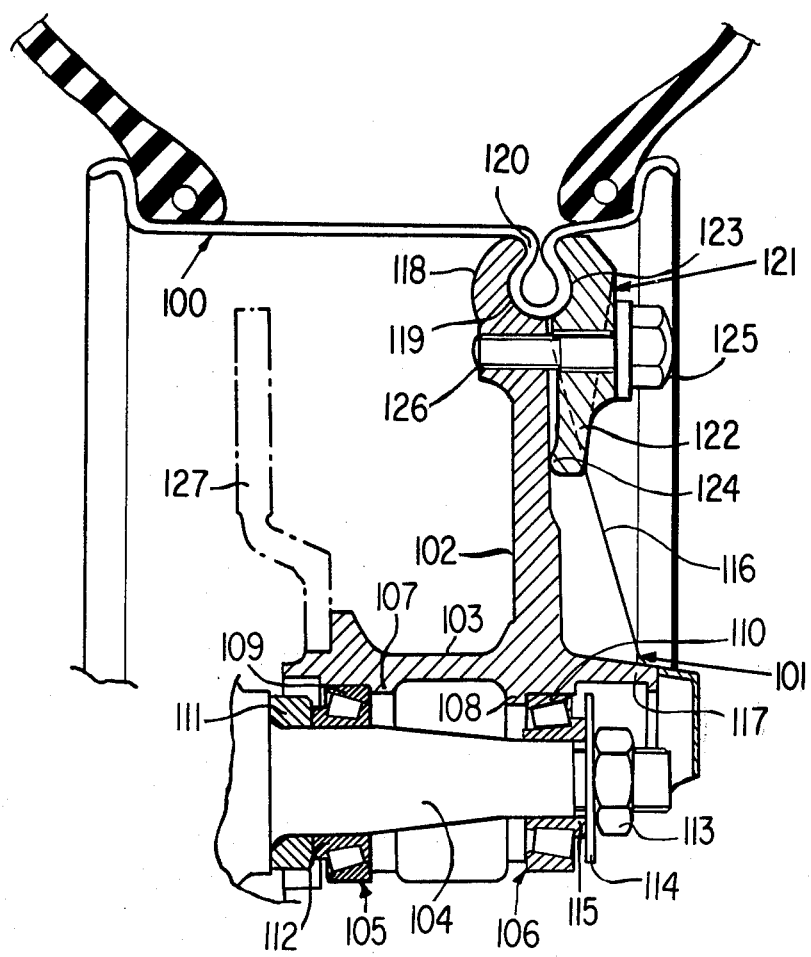
FIG. 13 is a cross-sectional view of a rim and tire assembly mounted on an integral hub and wheel centre.

In a sixth embodiment of the invention, illustrated in FIG. 13, a rim and tire assembly 100 such as described in respect of the first embodiment is mounted on a wheel body 101 comprising four spoke portions 102 extending radially outwardly from a central hub portion 103, the wheel body being rotatably mounted on a vehicle axle 104 by means of a pair of roller bearings 105, 106 located within the hub portion.

The hub portion 103 is of substantially cylindrical form and is formed with a central bore of stepped diameter so as to provide a pair of shoulders 107, 108 against which the outer edges 109, 110 of the bearings 105, 106 respectively may be located in spaced axial relationship. A shoulder 111 formed on the vehicle axle 104 provides a surface against which the inner cage 112 of the inboard bearing 105 may abut and a wheel nut screw 113 threaded to the end of the axle, and acting on a washer 114 which abuts the inner cage 115 of the outboard bearing 106, provides means for adjusting axial play in the pair of bearings.

The four spoke portions 102 are each formed integrally with the material of hub portion 103 and extend radially outwardly from that region of the hub portion in the vicinity of the outboard bearing 106. A pair of stiffening ribs 116 are formed between each spoke portion and an axially outboard region 117 of the hub portion so as to strengthen the spoke portions in a plane perpendicular to the hub portion.

Each spoke portion is formed at its radially outermost end 118 with circumferentially extending recess 119 suitably shaped so as to engage the inboard side of a radially inwardly extending bead portion 120 of the rim and tire assembly 100, and a clamp arrangement 121 is provided on each spoke portion to clamp the bead portion thereto.

The clamp arrangement each comprise a clamp plate 122 formed at one end, a radially outer end relative to the wheel body, with a recess 123, for engagement with the outboard side of the bead portion 120 and formed at the other, radially inner end with a substantially tangentially extending protrusion 124 the protrusion and recess being formed in the same side of the clamp plate.

The clamp plate 121 is provided with a central hole through which a clamp bolt 125 extends into screw-threaded engagement with a tapped hole 126 in the associated spoke portions, and the clamp plate is orientated such that when the bolt is tightened the recess 123 in the plate grips the bead portion against the recess 119 in the spoke portion of the wheel body. The radially inner end of each clamp plate extends between the pair of ribs 116 formed on the associated spoke portion, and the protrusion 124 extending from the surface of the plate bears on the spoke portion to provide a pivot axis about which the recess in the clamp plate rotates as the clamp bolt is tightened.

Whilst in the embodiment described the spoke portions are each formed integrally with the material of the hub portion, the wheel body may alternatively comprise an integral assembly of spoke portions permanently secured to a hub portion. For example, four spoke portions may be formed integrally with, and extend radially outwardly from, a central boss which may be shrink-fitted into normally permanent engagement with a hub portion.

A brake member in the form of, for example, a brake disc 127 or alternatively a brake drum may conveniently be secured to or formed, at least in part, as a part of the integral wheel body.

In the second and third embodiments described above the deformable pressing element is employed for the formation of protrusions or humps in the base portion of the wheel rim, but in accordance with another aspect of the invention a suitable deformable pressing element may alternatively be utilized to form or partly form the entire profile of a wheel rim from, for example, a cylindrical sheet metal blank of substantially uniform diameter.

Figure 14:
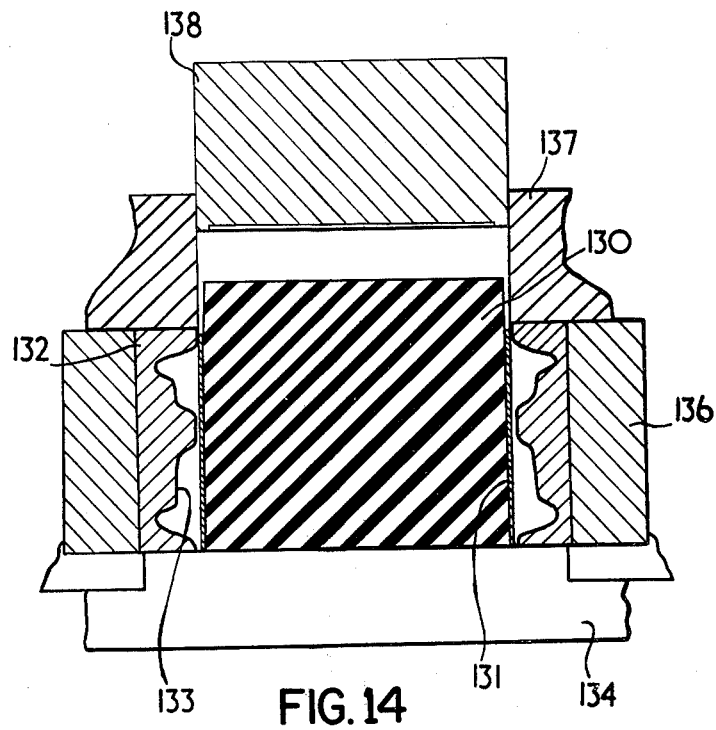
FIG. 14 is a cross-sectional view of an apparatus for the formation of a wheel rim.
Figure 15:
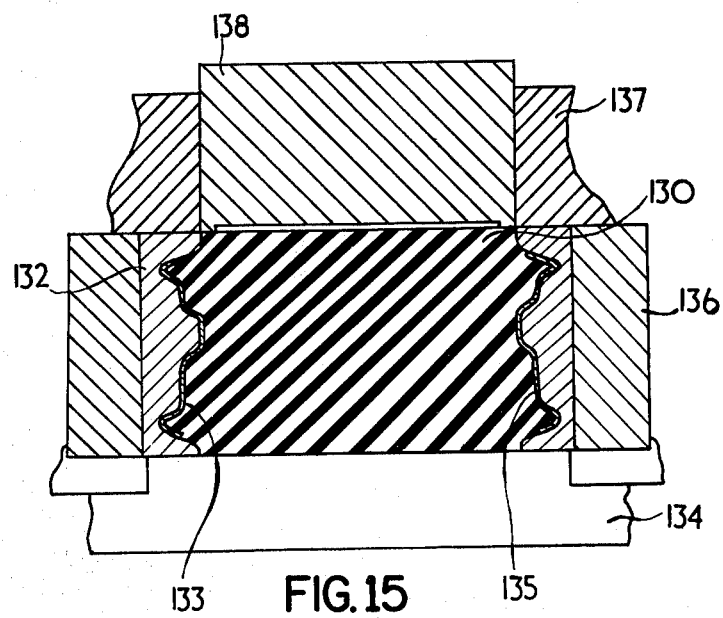
FIG. 15 is a similar view to that of FIG. 14 after the formation of a wheel rim.

In a seventh embodiment illustrated in FIG. 14 and FIG. 15, a method for the manufacture of a wheel rim having, for example a profile of the kind illustrated in FIG. 1 comprises utilizing a deformable pressing element 130 which may be compressed under the action of a press so as to expand a sheet metal blank 131 (see FIG. 14) radially outwardly against an annular die member 132.

The annular die member 132 is formed on its radially inner surface 133 with the desired wheel rim profile, and comprises a pair of segments lockable onto a base plate 134 and of semi-circular shape so as to permit removal of a wheel rim 135 (see FIG. 15) formed within the segments. An annular locking member 136 extends around the outer periphery of the die member and secures the segments together against forces generated within the die member during the formation of the wheel rim.

An annular guide member 137 is secured to that side of the die member 132 furthest from the base plate 134 and serves to locate and axially guide a movable flat ended piston 138 relative to the die member.

In the manufacture of a wheel rim 135 from a tubular blank 131 formed from a strip of sheet metal, the blank is located within the annular die member 132 and a pressing element 130 comprising a cylindrical block of deformable material such as rubber or polyurethane is positioned within the blank. When in the unstressed condition the pressing element 130 has a greater axial length than the block, but is arranged to be axially compressed under the action of the press acting on the flat ended piston 138 so as to expand the blank radially outwardly and form the blank into a wheel rim 135 having a profile defined by the annular die member 132.

The method described above has the advantage that it permits the manufacture of wheel rims which are relatively free of any marks such as may be caused by spinning and other operations conventionally used in the manufacture of wheel rims. Furthermore, by the use of a carefully machined die member wheel rims may be economically produced to a high degree of accuracy and concentricity.

Although in the method described above with reference to FIGS. 14 and 15 a wheel rim is formed from a tubular blank of sheet metal, the method may also be applied to a wheel rim which is formed diametrically undersize using conventional methods. The wheel rim is subsequently expanded to the required final size under the action of a pressing element so as to form the profile to the high degree of accuracy and concentricity attainable by the use of an annular die member of the kind described.

Having now described my invention, what I claim is:

1. A pneumatic tire and wheel rim assembly comprising a sheet metal wheel rim having circumferentially extending said flanges and a base portion therebetween, the base portion having a circumferentially extending channel portion projecting radially inwardly therefrom said channel being loop shaped with the edges of the loop spaced slightly apart of the juncture of the loop with the base.

2. A pneumatic tire and wheel rim assembly according to claim 1 wherein a circumferentially extending locking member is located in the channel of the wheel rim and is arranged to axially locate a tire bead between the locking member and a rim flange.

3. A pneumatic tire and wheel rim assembly according to claim 2 wherein the locking member is in the form of a ring of deformable material.

4. A pneumatic tire and wheel rim assembly according to claim 2 wherein the locking member is in the form of a split metal ring.

5. A pneumatic tire and wheel rim assembly according to claim 1 wherein a circumferentially extending and radially outwardly projecting protrusion is provided in the base portion of the wheel rim.

6. A pneumatic tire and wheel rim assembly according to claim 1 wherein the channel is of substantially circular cross-section.

7. A pneumatic tire and wheel assembly according to claim 1 wherein the channel is formed substantially adjacent a tire bead seating portion.

8. A pneumatic tire and wheel rim assembly according to claim 1 wherein the channel is formed substantially centrally with respect to the axial width of the base portion.

9. A pneumatic tire and wheel rim assembly according to claim 1 wherein the rim flanges extend axially and radially outwardly to support the bead and lower sidewall regions of the tire.

10. A pneumatic tire and wheel rim assembly according to claim 1 wherein an inflation valve is fitted to the channel of the wheel rim.

11. A pneumatic tire and wheel assembly comprising a wheel rim having circumferentially outwardly extending said flanges, bead seats adjacent the flanges and a base portion of substantially non-decreasing diameter between the bead seats;
a tire mounted on the rim having beads, said tire beads each having an axial width;
said base portion having a radially inwardly directed circumferentially extending channel with the channel having a mouth with an axial width less than that of either tire bead so that a tire bead is excluded from entry into the channel to a depth sufficient to permit the diametrically opposite portion of the bead from passing over its side flange.

12. The assembly of claim 11 in which the rim is of one piece sheet metal construction.

13. The assembly of claim 11 in which the base portion has at least one circumferentially extending and radially outwardly projecting protrusion having an external diameter greater than the diameter of the tire beads.

* * * * *

UNITED STATES PATENT AND TRADEMARK OFFICE
CERTIFICATE OF CORRECTION

PATENT NO. : 3,895,867
DATED : July 22, 1975
INVENTOR(S) : Lo et al.

It is certified that error appears in the above-identified patent and that said Letters Patent are hereby corrected as shown below:

Col. 1, line 62, "for" should read --from--;

Col. 9, line 6, "finish" should read --furnish--;

Col. 12, line 35, "and the N" should read --and N--;

Col. 13, line 34, "the step" should read --in step--;

Col. 14, line 8, "to" should read --two--;

Col. 15, line 45, "of each" should read --said--; and

Col. 15, line 46, "ofeach" should read --of each--.

Signed and Sealed this seventeenth Day of February 1976

[SEAL]

Attest:

RUTH C. MASON
Attesting Officer

C. MARSHALL DANN
Commissioner of Patents and Trademarks